Dec. 8, 1959 N. R. FOSTER 2,916,731
ICE DETECTOR
Filed April 6, 1956

INVENTOR.
Ned R. Foster
BY Craig V. Morton
HIS ATTORNEY

United States Patent Office 2,916,731
Patented Dec. 8, 1959

2,916,731

ICE DETECTOR

Ned R. Foster, Vandalia, Ohio, assignor to General Motors Corporation, Detroit, Mich., a corporation of Delaware Application April 6, 1956, Serial No. 576,717

2 Claims. (Cl. 340—234)

This invention relates to means for sensing impending icing conditions during aircraft flight and ground engine operation, and particularly to an "evaporative-cooled" type ice detector for engine systems as well as air frame component protection.

The use of pilot warning and/or engine and "surface" ice protection devices and systems are well known in the aircraft industry. This invention pertains to an improved ice detector per se. Anti-icing devices may be continuously operated to prevent aircraft icing in critical areas. Deicing devices operate intermittently upon icing exceeding anti-icing protection. Ice detector sampling provides an indication of impending icing condition severity but often is erroneous because the detector is subject to "runback" freezing and false indication after the first indicating cycle. Often the detector is subject to considerable thermal lag in icing-deicing-re-icing indication such that the components protected are free of ice long before the detecting device is ready to re-cycle. The ice detector must also be less vulnerable to clogging by foreign objects that may lodge in orifices used previously.

An object of this invention is to provide an ice detector with a pressure differential switch actuating means having greater sensitivity to icing due to evaporative cooling effect for use with a conventional deicing or anti-icing system.

Another object is to provide an ice detector having an apertured probe providing minimum thermal lag for higher repeat frequency sampling cycles of icing, melting and re-icing.

Another object is to reduce vulnerability to clogging of an ice detector by providing a probe area covered by a screen, sieve, or wire mesh.

Another object is to provide a pneumatic ice detector having a heating element and adjacent screen or wire mesh which may ice over permitting actuation of a pressure differential switch that controls electrically-heated removal of ice.

Further objects and advantages of the present invention will be apparent from the following description, reference being had to the accompanying drawings wherein a preferred embodiment of the present invention is clearly shown.

Figure 1:
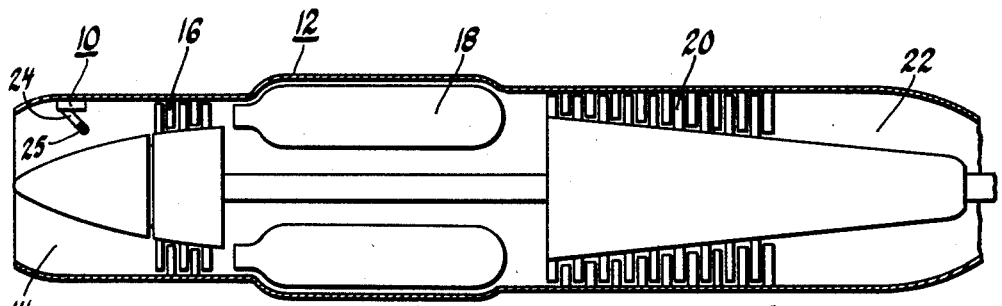
Figure 1 shows an ice detecting means of the present invention disposed in an air stream at the intake of an aircraft engine.

The aforementioned and other objects are accomplished in a preferred embodiment of the present invention by an ice detecting means capable of being mounted in an air stream comprising an ice detector assembly including a case, or housing, having a hollow cylindrical member or probe mounted thereon. The probe has an opening at one end thereof with a fine-mesh screen, restricting means, or sieve, covering attached thereto. The opening or aperture of the probe permits air stream pressure to be channeled through a port passage formed through the hollow probe to a chamber formed inside said housing on one side of a diaphragm or pressure responsive means reciprocally disposed in said housing.

The diaphragm may be operatively attached by a connecting rod to a pressure differential switch means having a pair of contacts normally biased to a closed position. The diaphragm may also actuate a plunger of a normally closed snap action switch. Air pressure, ported through the screened inlet aperture and hollow probe to the chamber adjacent the diaphragm, actuates and displaces the diaphragm to open the contacts of the differential switch means during normal operation as long as the probe is subject to air stream pressure. However, air pressure will be cut off from the diaphragm when the restricting means or screen becomes iced over. Then the biasing of contacts to a normally closed position closes a circuit which includes a battery.

Engagement of the normally closed contacts closes a circuit to an electrical element, heating unit or ice removal means disposed in the probe adjacent the screen which will ice over under certain conditions. The heating means will melt ice from the screen and restore air pressure to one side of the diaphragm for separating the normally closed switching means contacts. The circuit closed by the normally closed contacts may include an indicator in the pilot's cockpit, such as a warning light, and/or other ice removal means on the aircraft in addition to the heating unit in the probe as described. The frequency of signals to the cockpit may be interpreted as an indication of impending icing condition severity with the pilot having the option of manually energizing additional ice removal means or with automatic simultaneous energization thereof with the heating unit of the probe.

In operation, water droplets in the air stream impinging on the fine wire screen covering the probe opening are cooled to freezing by the cooling effect due to heat absorption from these water droplets required to evaporate preceding water particles from a liquid to a vapor state. This "evaporative cooling" may cause icing over of the screen even at air stream temperatures above 32° F. so that air stream total pressure cannot be maintained on the one side of the diaphragm tripping the switch as outlined above.

The probe may be mounted at a swept back angle with respect to the base assembly to aid ice removal by the heating element. With such a mounting, a single truncated cylindrical member fitted with a screened end cap over the opening at one end thereof is provided with the heating element adjacent the screen. Air stream pressure is ported through a passage to one side of the diaphragm as outlined above.

With particular reference to Figure 1, an ice detector generally indicated by the numeral 10 is shown mounted in the air intake of a jet engine generally indicated by the numeral 12. The air intake 14 is located in the forward portion of the engine 12 and provides a supply of air to the compressor 16 and then to the combustion chambers 18 where the compressed air is mixed with fuel and burned to escape at a high temperature to drive a multi-stage turbine 20 ultimately leaving the engine through an exhaust portion 22 of the engine. The ice detector 10 may be also used with turbo-prop and reciprocating piston engines as well as on air frame surfaces for detecing impeding icing conditions quickly and accurately so that a signal may be relayed to the pilot and/or ice removal heating means actuated thereby. The detector 10 is preferably mounted in a depending position as shown in Figure 1.

Figure 2:
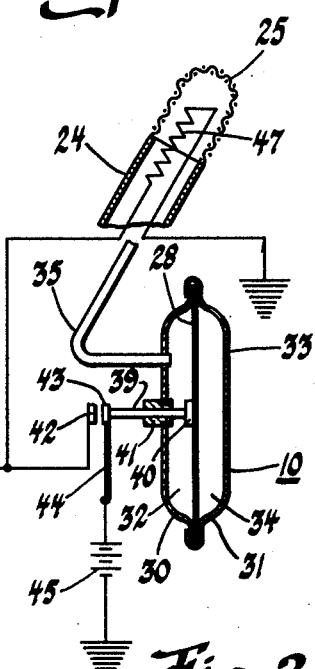
Figure 2 is a schematic representation of the ice detector showing a screen-covered probe opening adjacent a heating element in an electrical circuit closed by contacts operable by a pressure differential switch responsive to air stream pressure detected by means of the screen of the probe and conveyed through a pipe or conduit to the switch.
Figure 3:
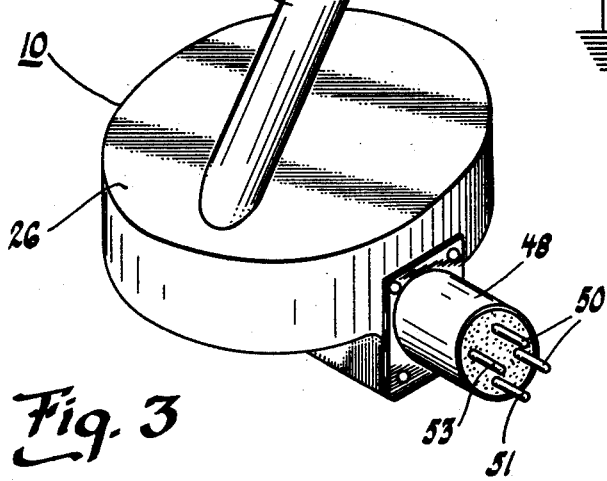
Figure 3 is an enlarged perspective view of the ice detector shown in Figure 1 having an electrical multiprong socket plug providing switch and electrical connections for electrically-heated removal of ice.

The schematic representation of the ice detector 10 shown in Figure 1 is provided in Figure 2. The ice detector includes a hollow probe 24 having a screen or wire mesh 25 fitted as a cap to an open end of the probe. As shown in a perspective view of Figure 3, the probe 24 may be mounted at a swept back angle on a case, or housing, 26 in which pressure differential switching means are operably disposed. The purpose of mounting the probe 24 in a swept back relation as shown in Figures 1 and 3 is to aid in removal of ice. The ice accumulates on the screen 25 due to evaporative cooling imparted to water particles caught on the mesh by evaporation of previous particles which accumulated on the screen therefrom.

The case 26 houses a diaphragm 28, shown schematically in Figure 2, dividing space between cup-shaped members 30 and 31 into two chambers 32 and 34, respectively. A bleed or vent aperture 33 may be provided in member 31 to permit deflection of diaphragm 28 by impact pressure to chamber 32. A conduit 35 may be provided forming a passage for air at any pressure to be channeled through the screen 25 and probe 24 to the chamber 32 formed with the cup 30 on one side of the diaphragm 28. The air pressure in chamber 32 is normally of sufficient magnitude such that a rod 39, connected with the diaphragm 28 by a suitable fitting 40 and reciprocal through a fitting 41 fitted through an opening of cup-shaped member 30, opens the normally closed electrical contacts 42 and 43. A spring member 44 of the pressure differential switch biases contacts 42—43 to a normally closed position. The contacts 42 and 43 are provided in a circuit means including wiring and a battery 45. Upon closing of the contacts 42—43, a heating element 47 operably disposed in the probe 24 adjacent the interior of screen 25 is energized so as to melt accumulated ice from the screen or mesh 25. The contacts 42—43 are closed when the pressure in air chamber 32 is cut off due to icing over of the screen 25 and the heating unit 47 remains energized for melting the ice from the screen 25 until air pressure is restored to the air chamber 32 to open normally closed contacts 42—43 against the bias of pressure differential switch spring 44. The force of spring 44 is light relative to the air pressure force in chamber 32 on diaphragm 28 when screen 25 is not iced over. Thus, air pressure can easily open contacts 42—43.

The perspective view of Figure 3 shows an electrical socket plug 48 disposed with the case 26 providing switch and deicing terminal connections for the ice detector 10. Two of these contacts or prongs 50 may provide battery connections, for example, and the other prongs 51 and 53 may connect with other ice removal heating devices or pilot indicating or warning devices also actuated by the pressure differential relay switch as illustrated in the schematic representation of Figure 2.

Figure 4:
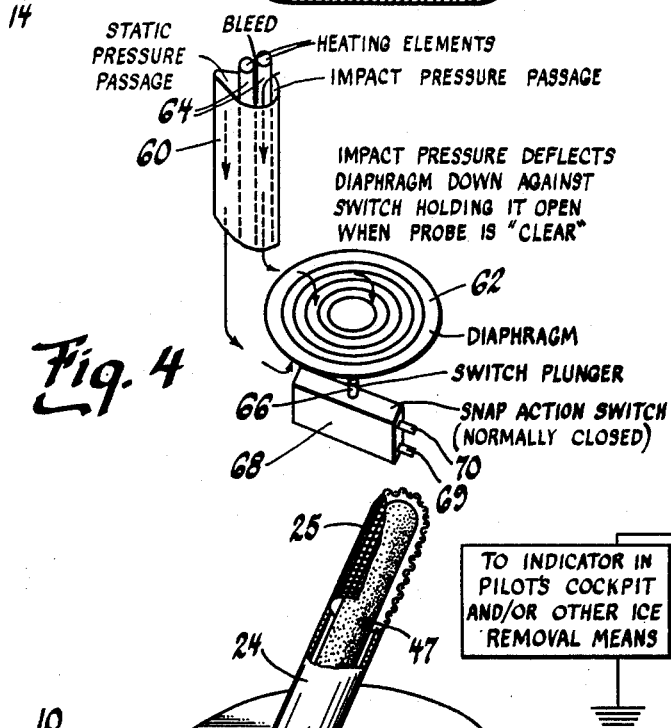
Figure 4 shows a fragmentary schematic representation of a probe supplying impact pressure passage to a diaphragm deflecting the diaphragm to hold open a normally-closed snap action switch when the probe is free of ice.

Figure 4 is a fragmentary schematic representation of a probe 60 supplying impact pressure passage to a diaphragm 62. Heating elements 64 are disposed in the probe for the same purpose outlined in the description with Figure 2. Impact pressure air passage occurs through probe 60 as represented by the arrows deflecting the diaphragm 62 against a switch actuating plunger 66 of a normally closed snap action switch 68 of conventional commercial type. The switch 68 is provided with wiring terminals 69 and 70. Impact pressure deflects the diaphragm 62 against plunger 66 of switch 68 holding it open only when the probe is free and clear of ice as described. Thus, an ice detector operably dependent upon only one positive pressure, that is, impact pressure, is shown energizing a heating element for clearing a probe of ice accretion whenever the impact pressure is blocked off from the diaphragm.

Among the advantages provided by the present ice detector are (1) greater sensitivity due to the evaporative cooling effect and small amount of ice build-up required for positive detection (allows lead time for ice protection devices; hence, use of anti-icing over deicing), (2) the screen covering one aperture of the air intake probe makes the passage connected with the chamber which maintains the diaphragm away from the plunger for energizing the relay switch free from clogging by foreign objects, (3) higher frequency of ice detector sampling (icing-deicing-re-icing) by virtue of reduced mass to heat and cool (or minimum thermal lag), (4) greater reliability by providing positive ice removal on a screen by a heating unit so that the total air pressure pick-up will accurately detect icing without being subject to "runback" freezing and false indication after the first indicating cycle.

The frequency of energization and indication of impending icing conditions is indicative of the severity of impending icing conditions. Aircraft equipped with the subject ice detector will be better protected from dangers of excessive icing occurring on engine systems and air frame components. The indication to the pilot may warn him to manually actuate other ice removal means for the aircraft or the circuit may automatically energize such additional means.

While the embodiments of the present invention as herein disclosed constitute a preferred form, it is to be understood that other forms might be adopted.

What is claimed is as follows:

1. A device for sensing impending icing conditions on aircraft, comprising, a housing having a space therein, a diaphragm flexibly disposed in said housing and forming an air chamber in the space therewith on one side thereof, a hollow probe attached at one end to said housing and formed by a single truncated cylindrical member having an opening only at an end remote from said housing to provide a single passage for air at any pressure to be channeled only to the air chamber at one side of said diaphragm, a fine-mesh sieve-like cup-shaped end cap fitted over the opening at one end of said truncated cylindrical member, electrical heating means extending longitudinally through the single passage in said truncated cylindrical member and protruding through the opening at an end thereof remote from said housing and spaced to be adjacent to an inner periphery of said sieve-like end cap, a pair of contacts one of which is connected to said diaphragm and is adapted to engage the other contact, and a spring means biasing said contact which is connected to said diaphragm toward said other contact into normally closed position for completing a connection to establish energization of said electrical heating means for melting ice from said sieve-like end cap, said probe being mounted relative to said housing at a swept-back angle relative to air flow to aid in removal of ice loosened from said sieve-like end cap by heat from energization of said electrical heating means, said sieve-like end cap over the opening at one end of said swept-back probe having relatively high sensitivity to icing due to evaporative cooling of water droplets in an air stream impinging thereon and cooled to freezing by cooling effect due to heat absorption from these water droplets from a liquid to a vapor state as icing over of said sieve-like end cap can occur at air stream temperatures even above 32° F. so that air stream pressure cannot be channeled into the one chamber against one side of said diaphragm to overcome force of said spring means which effects movement of said contact connected thereto into normally closed position relative to said other contact for effecting energization of said electrical heating means, said sieve-like end cap located remote from said housing being relatively less vulnerable to clogging by foreign objects and being protected against erroneous sensing of impending icing because "run back" freezing is eliminated as ice loosened by heat due to energization of said electrical heating means is forced off of said sieve-like end cap by air stream flow along said swept-back probe at an end remote from said housing.

2. The device of claim 1 wherein said housing includes an electrical socket plug projecting laterally thereof and having prongs protruding therefrom for connection to said contacts and adapted to permit energization of said electrical heating means spaced adjacent to an inner periphery of said sieve-like end cap of said swept-back probe on said housing.

References Cited in the file of this patent
UNITED STATES PATENTS

| | | |
|---|---|---|
| 2,460,165 | Britton | Jan. 25, 1949 |
| 2,464,047 | Larkin | Mar. 8, 1949 |
| 2,541,512 | Hahn | Feb. 13, 1951 |
| 2,724,106 | Fraser | Nov. 15, 1955 |
| 2,755,456 | Bursack | July 17, 1956 |
| 2,775,679 | Flubacker | Dec. 25, 1956 |